United States Patent
Nobuyasu et al.

(10) Patent No.: US 9,217,478 B2
(45) Date of Patent: Dec. 22, 2015

(54) RELEASE MECHANISM FOR FRICTION CLUTCH

(71) Applicant: TOYOTA JIDOSHA KABUSHIKI KAISHA, Toyota-shi (JP)

(72) Inventors: Seitaro Nobuyasu, Susono (JP); Yuji Iwase, Mishima (JP); Yosuke Suzuki, Hadano (JP); Koichi Kato, Susono (JP); Kensei Hata, Sunto-gun (JP); Taro Moteki, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/638,559

(22) Filed: Mar. 4, 2015

(65) Prior Publication Data
US 2015/0252858 A1 Sep. 10, 2015

(51) Int. Cl.
*F16D 19/00* (2006.01)
*F16D 25/0635* (2006.01)
*F16D 13/38* (2006.01)

(52) U.S. Cl.
CPC ............ *F16D 25/0635* (2013.01); *F16D 13/38* (2013.01)

(58) Field of Classification Search
CPC .............................. F16D 25/0635; F16D 13/38
See application file for complete search history.

(56) References Cited

U.S. PATENT DOCUMENTS

| | | |
|---|---|---|
| 5,927,418 A | 7/1999 | Matsuoka |
| 2014/0234093 A1 | 8/2014 | Yamashita et al. |

FOREIGN PATENT DOCUMENTS

| | | |
|---|---|---|
| JP | 10-2352 | 1/1998 |
| JP | 2005-188596 | 7/2005 |
| JP | 2013-76419 | 4/2013 |

*Primary Examiner* — David J Hlavka
(74) *Attorney, Agent, or Firm* — Oblon, McClelland, Maier & Neustadt, L.L.P.

(57) ABSTRACT

In a release mechanism for a friction clutch that includes a cylinder portion formed by an inner body and an outer body, a piston that moves in a front-back direction in accordance with a fluid pressure supplied to the cylinder portion, and a plate that is formed on the piston and receives an elastic force from elastic members provided on an outer peripheral side of the cylinder portion in a circumferential direction at a predetermined interval, a fastening member that fixes flanges of the inner body and the outer body so as to clamp a sealing member therebetween in an axial direction is provided, and a region in the radial direction in which the fastening member is arranged and a region in the radial direction in which the elastic members are arranged overlap each other at least in part, in the flanges.

5 Claims, 15 Drawing Sheets and # RELEASE MECHANISM FOR FRICTION CLUTCH

INCORPORATION BY REFERENCE

The disclosure of Japanese Patent Application No. 2014-041209 filed on Mar. 4, 2014 including the specification, drawings and abstract is incorporated herein by reference in its entirety.

BACKGROUND OF THE INVENTION

1. Field of the Invention

The invention relates to a release mechanism that is configured to vary an engagement pressure of a friction clutch by causing a load in an axial direction to act thereon in accordance with a supplied fluid pressure.

2. Description of Related Art

Japanese Patent Application Publication No. 2005-188596 (JP 2005-188596 A) and Japanese Patent Application Publication No. 10-2352 disclose a configuration of a release mechanism configured to vary the engagement pressure of a friction clutch by causing a load based on a fluid pressure and a spring force of a spring to act on one of the rotating members of the friction clutch via a diaphragm spring. The release mechanism described in JP 2005-188596 A is configured such that the load based on a hydraulic pressure supplied between cylindrically formed inner and outer bodies and the spring force of the spring provided on the side of one end of the outer body are caused to act on the diaphragm spring. Flanges that extend toward an outer periphery side are formed respectively on the other ends of the inner body and the outer body such that the inner body and the outer body are fixed to each other by screw fitting the inner body to the outer body with a sealing member clamped between the flanges. An outer peripheral portion of the flange of the outer body is formed so as to cover an outer peripheral surface of the flange of the inner body. A part of the flange of the outer body located on the outer peripheral side of the flange of the inner body is fixed to a housing.

SUMMARY OF THE INVENTION

To make an axial length of the release mechanism short, it is preferable to provide the spring on the outer peripheral side of the outer body. In that case, if the spring is provided on the outer peripheral side of the outer body, the spring may interfere with such portions as a head of a bolt that fixes the flange of the outer body and the flange of the inner body in the axial direction thereof and a head of a bolt that fixes the outer body to a fixing portion such as the housing. To prevent the spring from interfere with such portions, it may be connected the outer body and the inner body at an outer peripheral side than the spring or connected the outer body and the fixing portion by a bolt. However, when a bolt is arranged on the outer peripheral side of the outer body, the sealing member becomes distanced from the connecting portion connected by the bolt, and the sealing performance may be deteriorated.

On the other hand, when a sealing member with a larger diameter is arranged in the vicinity of the connecting portion, an area that receives the pressure of the fluid present between the respective flanges increases, and consequently, the load that acts to separate the outer body from the inner body in the axial direction increases. Accordingly, the outer body may have to be made thicker so as to enhance the rigidity of the outer body. Alternatively, the housing may have to be made thicker because the length for engaging the bolt becomes longer. As a result, the axial length of the release mechanism or the axial length of a device as a whole by being mounted with the release mechanism may have to be made longer.

The invention provides a release mechanism for a friction clutch that can make an axial length of the release mechanism short.

According to a first aspect of the invention, a release mechanism for a friction clutch includes an inner body, an outer body, a cylinder, a piston, a first flange, a second flange, a sealing member, a plate, a plurality of elastic members, and a first fastening member. The outer body fits to an outer peripheral side of the inner body. The cylinder is arranged between an outer peripheral surface of the inner body and an inner peripheral surface of the outer body. The cylinder has an annular cross-section. The piston is accommodated in the cylinder and the piston is configured to move in an axial direction of the cylinder. The first flange located at a first end of the inner body in an axial direction of the cylinder, and the first flange extends radially outward of the inner body. The second flange is located at a second end of the outer body in an axial direction of the cylinder, the second flange extends radially outward of the outer body, and the second flange faces the first flange. The sealing member located between the first flange and the second flange, the first flange and the second flange is connected via the sealing member. The plate is connected to the piston at a third end side of the outer body in the axial direction of the cylinder. The plate faces the first flange and the second flange. The plurality of elastic members is arranged between the plate and the second flange at a predetermined interval in a circumferential direction of the outer body. The first fastening member is configured to fix the first flange and the second flange in the axial direction of the cylinder such that the sealing member is clamped between the first flange and the second flange. A first region is a region of the first flange and the second flange in a radial direction of the first flange and the second flange, and the first fastening member is arranged in the first region. A second region is a region of the first flange and the second flange in the radial direction of the first flange and the second flange, the elastic members are arranged in the second region, and the first region and the second region overlap each other at least in part.

The release mechanism may further include a second fastening member. The second fastening member may be configured to connect the outer body and the inner body to a fixing portion in the axial direction of the cylinder. The first fastening member may be configure to fix the first flange of the inner body and the second flange of the outer body in the axial direction of the cylinder, and the first fastening member may be screwed to the second flange.

In the release mechanism, the second fastening member may be screwed to the fixing portion, the second fastening member may be configured to connect the inner body and the outer body to the fixing portion. A third region in the radial direction in which the second fastening member is provided and the second region in the radial direction in which the elastic members are arranged, in the first flange and the second flange, may overlap each other at least in part.

In the release mechanism, the fixing portion has recessed and convex portions that engage with the outer body in the circumferential direction of the outer body, and the second fastening member may be connected to the fixing portion and restricts the movement of the outer body in the axial direction of the cylinder.

In the release mechanism, the friction clutch may be mounted in a vehicle. The vehicle may include a transmission. The fixing portion may be a housing of the transmission.

According to the above structure, the first fastening member can be arranged on an inner side in the radial direction, and a position at which the respective flanges are fixed in the axial direction of the cylinder by the first fastening member can be brought close to a position of the sealing member. Accordingly, a pressure-receiving area that receives fluid pressure present between the respective flanges can be reduced, and the thickness of the respective flanges can be reduced. By reducing the thickness of the respective flanges, the axial length of the release mechanism can be made short.

Also, the inner body and the outer body are fixed in the axial direction to the flange of the outer body by the first fastening member, and the outer body and the inner body that have been fixed are connected to the fixing portion in the axial direction by the second fastening member. Accordingly, the load that connects the inner body and the outer body to the fixing portion can be reduced. As a result, the rigidity of the fixing portion can be reduced and therefore the thickness of the fixing portion can be reduced. Accordingly, an axial length of a device as a whole can be made short.

Further, the second fastening member is fixed to the fixing portion and is configured to connect, to the fixing portion, the inner body and the outer body that have been fixed by the first fastening member. Also, the region in the radial direction in which the second fastening member is arranged and the region in the radial direction in which the elastic members are arranged overlap, in the flange. Accordingly, the load that acts based on the fluid pressure present between the outer body and the inner body does not act on the second fastening member, the length to be fixed to the fixing portion can be made short. As a result, because the fixing portion can be made thin, it is unnecessary to increase the thickness of the fixing portion in order to secure the length for the internal screw portion, and therefore the axial length of the device as a whole can be made shorter when the release mechanism is mounted thereto.

According to the above structure, the fixing portion has recessed and convex portions on which the outer body is engaged in the circumferential direction, and the movement of the outer body, in the axial direction of the cylinder, is restricted by the second fastening member. Accordingly, it is unnecessary to make the fixing portion thick in order to form the internal screw portion, and therefore the axial length of the device as a whole can be made shorter when the release mechanism is mounted thereto.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 15:
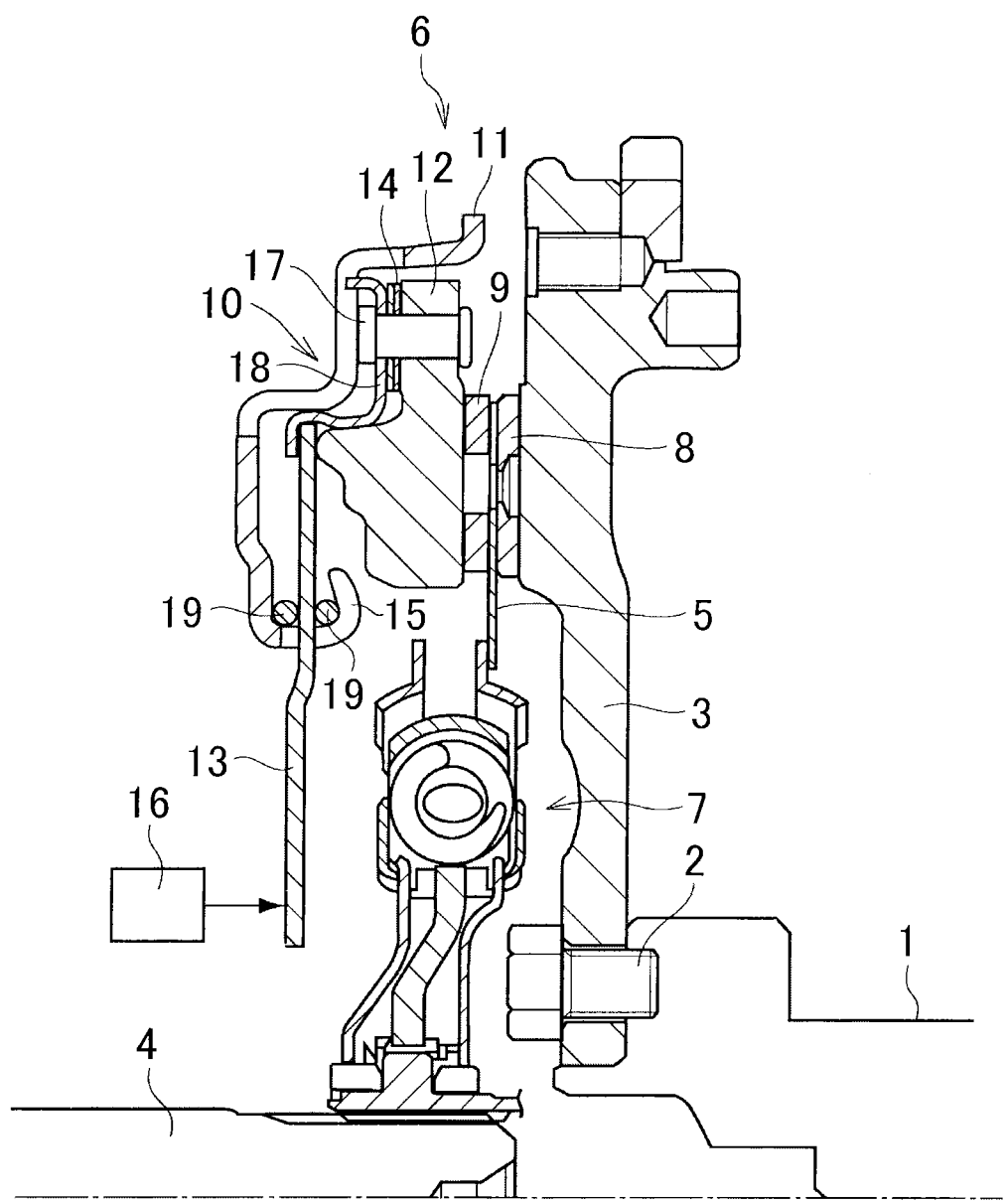
FIG. 15 is a cross-sectional view for explaining an example of a configuration of a friction clutch in which the engagement pressure is controlled by the release mechanism according to the invention.

FIG. 15 shows an example of a configuration of a friction clutch in which the engagement pressure is controlled by a release mechanism according one embodiment of the invention. The friction clutch shown in FIG. 15 is a dry friction clutch that is configured to selectively shut off the transmission of a torque between an engine and drive wheels. In the example shown in FIG. 15, the friction clutch is provided between the engine and a transmission mechanism, both of which are not shown. Specifically, a friction clutch 6 is provided so as to shut off the transmission of a torque by selectively releasing the engagement between a flywheel 3 and a clutch disc 5. The friction clutch 6 is integrated with an output shaft 1 of the engine via a bolt 2. The clutch disc 5 is engaged with an input shaft 4 of the transmission mechanism via a spline or the like. In the example shown in FIG. 15, a conventionally-known torsional damper 7 configured to absorb the fluctuation in the transmitted torque is provided between the input shaft 4 and the clutch disc 5.

The clutch disc 5 is a plate member formed in an annular shape. On both surfaces on an outer peripheral portion of the clutch disc 5, friction materials 8, 9 formed in annular shapes are connected integrally with the clutch disc 5 by rivets or the like, respectively. The friction materials 8, 9 are provided to control metal-to-metal contact between the flywheel 3 and the clutch disc 5 and that between a pressure plate 12, described later, and the disc 5. The friction materials 8, 9 are made of materials mainly including carbon or the like. Accordingly, the friction clutch 6 is configured such that a torque is transmitted by a contact between the flywheel 3 and the friction material 8 connected to a side surface of the clutch disc 5 on the engine side. A pressing mechanism 10 configured to press the clutch disc 5 against the flywheel 3 is provided on an opposite side of the flywheel 3 via the clutch disc 5. The friction clutch 6 shown in FIG. 15 is a dry friction clutch in which the friction material 8 and the flywheel 3 transmit a torque without the use of a lubricant; however, the friction clutch according to the invention may also be a wet friction clutch.

The pressing mechanism 10 shown in FIG. 15 includes an annular clutch cover 11, an annular pressure plate 12 and an annular diaphragm spring 13. The annular clutch cover 11 is integrated with the flywheel 3 via the rivets or the like, not shown. The annular pressure plate 12 rotates integrally with the clutch cover 11, and the annular pressure plate 12 is movable in an axial direction with respect to the clutch cover 11. The annular diaphragm spring 13 is formed to press the pressure plate 12 toward the flywheel 3 side. The clutch cover 11 and the pressure plate 12 are connected by a strap plate 14. One end of the strap plate 14 is connected to an inner wall surface of the clutch cover 11 and another end of the strap plate 14 is connected to the pressure plate 12, such that the clutch cover 11 and the pressure plate 12 rotate integrally with each other. Therefore, the flywheel 3 and the pressure plate 12 are connected to each other via the clutch cover 11 so as to rotate integrally with each other. The strap plate 14 is configured such that it causes an elastic force to act in a direction that separates the pressure plate 12 from the flywheel 3.

An outer peripheral portion of the diaphragm spring 13 is connected integrally with the pressure plate 12. The center portion of the diaphragm spring 13 in a radial direction is retained in a hook portion 15 formed in the clutch cover 11 such that a movement thereof in the axial direction is suppressed. The diaphragm spring 13 is configured such that it can move in the axial direction when an inner peripheral portion thereof receives load from a release mechanism 16 described later. More particularly, the outer peripheral portion of the diaphragm spring 13 is sandwiched between the pressure plate 12 and a retaining member 18 engaged to the pressure plate 12 via a rivet 17. The center portion of the diaphragm spring 13 is sandwiched between two annular pivot rings 19 that are hooked on the hook portion 15. Accordingly, in the example shown in FIG. 15, the diaphragm spring 13 is separated from the flywheel 3 when the inner peripheral portion thereof is pressed by the release mechanism 16.

In the friction clutch 6 configured as shown in FIG. 15, when the inner peripheral portion of the diaphragm spring 13 is not pressed in the axial direction by the release mechanism 16 or when the pressing force is relatively small, the pressure plate 12 is pressed toward the flywheel 3 side by the elastic force of the diaphragm spring 13, and the clutch disc 5 is clamped by the flywheel 3 and the pressure plate 12. Accordingly, a torque is transmitted from the flywheel 3 to the clutch disc 5 in accordance with the clamping force for clamping the clutch disc 5. In other words, a torque capacity transmitted by the friction clutch 6 changes in accordance with the clamping force. On the other hand, the load of the release mechanism 16 that presses the inner peripheral portion of the diaphragm spring 13 acts such that the outer peripheral portion of the diaphragm spring 13 separates from the flywheel 3. Consequently, if the load of the release mechanism 16 that presses the inner peripheral portion of the diaphragm spring 13 increases, the clamping force of the pressure plate 12 and the flywheel 3 for clamping the clutch disc 5 decreases, and the torque capacity transmitted by the friction clutch 6 decreases.

Figure 1:
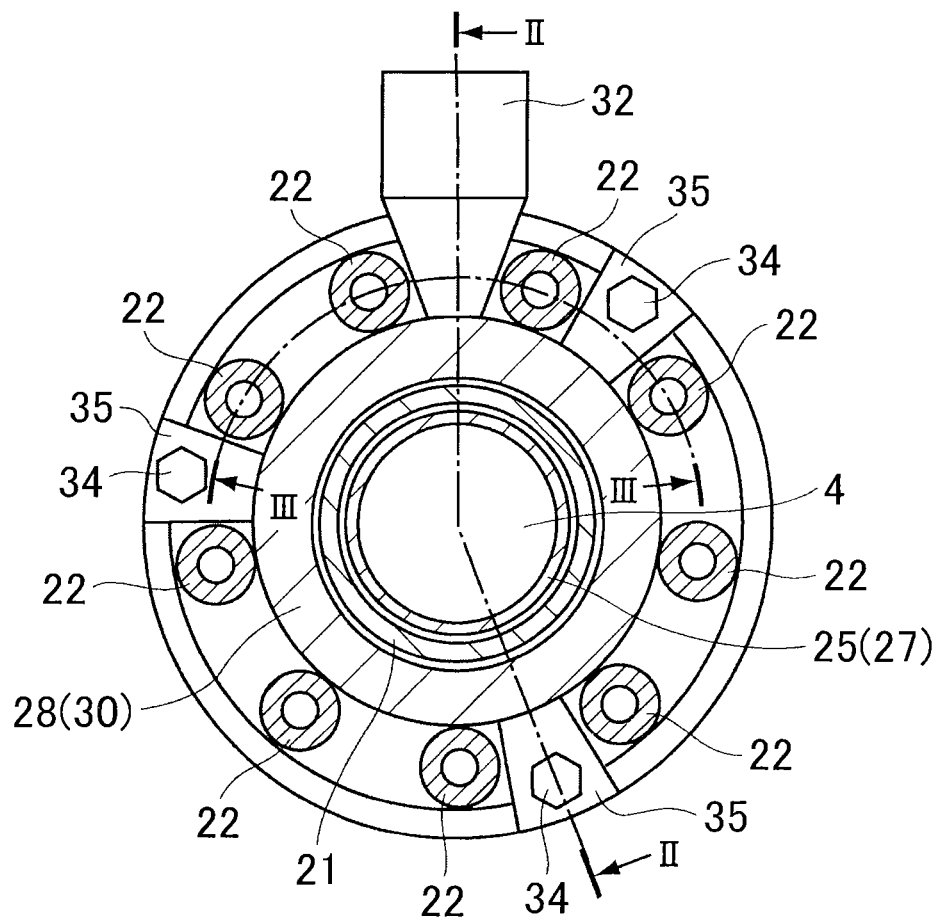
FIG. 1 is a cross-sectional view that illustrates an example of a release mechanism according to an embodiment of the invention.
Figure 2:
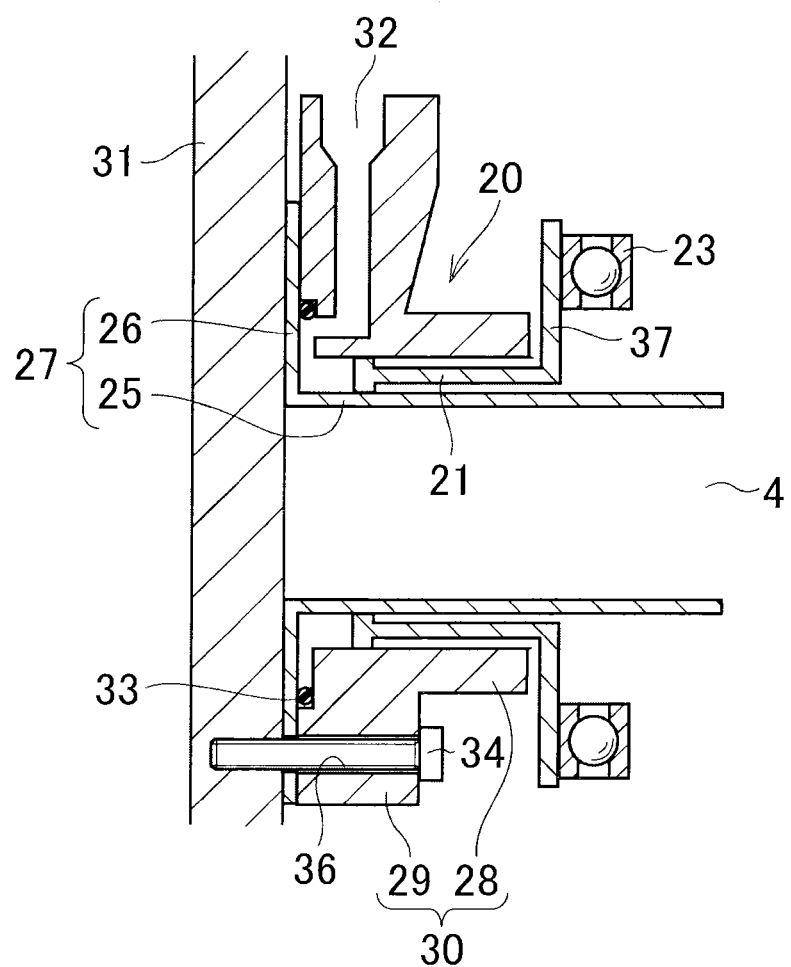
FIG. 2 is a cross-sectional view taken along the line II-II shown in FIG. 1.
Figure 3:
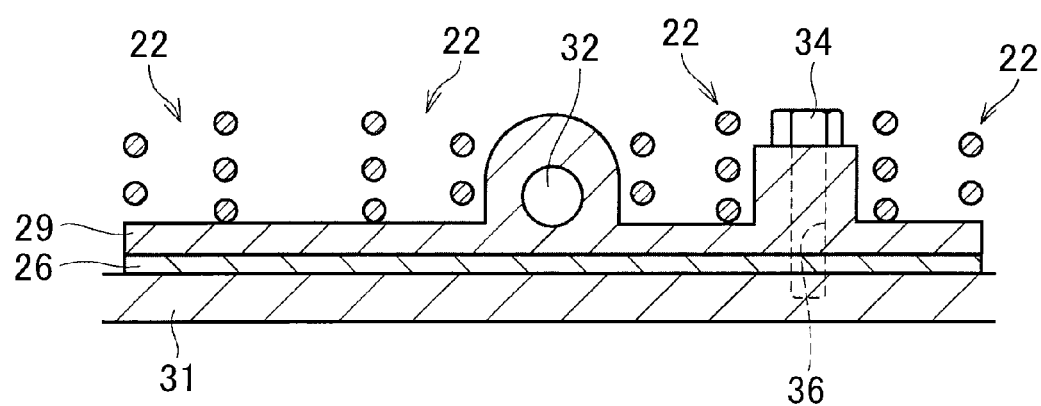
FIG. 3 is a cross-sectional view taken along the line III-III shown in FIG. 1.

As described above, an example of a configuration the release mechanism 16 that presses the inner peripheral portion of the diaphragm spring 13 is shown in FIGS. 1 through 3. The release mechanism 16 shown in FIGS. 1 through 3 includes a hydraulic cylinder 20, a piston 21, a plurality of preload springs 22 a release bearing 23. The hydraulic cylinder 20 is fittingly provided on the input shaft 4 of the transmission mechanism. The piston 21 is fittingly provided on the hydraulic cylinder 20. The plurality of preload springs 22 disposed on an outer peripheral side of the hydraulic cylinder 20 in a circumferential direction of the hydraulic cylinder 20 at a predetermined interval. The release bearing 23 presses the inner peripheral portion of the diaphragm spring 13 in the axial direction of the diaphragm spring 13 upon receiving the load from the piston 21 and the preload springs 22. In other words, the release mechanism 16 is configured such that a load that presses the diaphragm spring 13 is varied in accordance with a hydraulic pressure supplied to the hydraulic cylinder 20. Note that, a medium supplied to the hydraulic cylinder 20 may be a pressure fluid, and the medium may also be a gas in addition to an oil.

The hydraulic cylinder 20 includes, as shown in FIG. 2, an inner body 27 and an outer body 30. The inner body includes has a first cylindrical portion 25 and a first flange 26. The first cylindrical portion 25 is fitted to the input shaft 4. The first flange 26 is formed such that an end of the first cylindrical portion 25 on the transmission mechanism side extends toward the outer peripheral side. The outer body 30 includes a second cylindrical portion 28 and a second flange 29. The second cylindrical portion 28 is fitted on the outer peripheral side of the first cylindrical portion 25 at a predetermined gap therebetween. The second flange 29 is formed such that an end of the second cylindrical portion 28 on the transmission mechanism side extends toward the outer peripheral side. Specifically, one side wall surface of the first flange 26 is provided in contact with a housing 31 of the transmission mechanism, and the second flange 29 is provided so as to clamp the first flange 26 between the housing 31 and the second flange 29. A rigidity required of the inner body 27 is low, because the inner body 27 is provided in contact with the input shaft 4 and the housing 31 of the transmission mechanism. Accordingly, the inner body 27 is formed thinner than the outer body 30. Also, in the example shown in FIGS. 1 through 3, an oil passage 32 that penetrates the second flange 29 in the radial direction thereof is formed so that oil is supplied from a hydraulic actuator, not shown, to a gap between each of the first cylindrical portion 25 and the second cylindrical portion 28.

A sealing member 33 such as an O-ring is inserted and clamped between each of the first flange 26 and the second flange 29 to maintain a fluid-tight state inside the hydraulic cylinder 20. Specifically, to compress the sealing member 33 and to enhance the sealing performance thereby, a second bolt 34 is screwed to the housing 31 of the transmission mechanism so as to clamp each of the first flange 26 and the second flange 29 on an outer peripheral side of the sealing member 33. More specifically, as shown in FIGS. 1 and 3, the second flange 29 has base portions 35 formed at a predetermined interval in the circumferential direction and protrude in the axial direction, and at positions where the base portions 35 are formed, through holes 36 that penetrate through each of the first flange 26 and the second flange 29 are formed. Further, the second bolt 34 is screwed to the housing 31 such that a head of the second bolt 34 is in contact with the second flange 29.

The hydraulic cylinder 20 is formed between an outer peripheral surface of the first cylindrical portion 25 and an inner peripheral surface of the second cylindrical portion 28 such that it has an annular cross-sectional shape. In the hydraulic cylinder 20, the piston 21 formed in an annular shape is provided to fit to the hydraulic cylinder 20 so as to be slidable in the axial direction of the hydraulic cylinder 20. A sealing member is integrally provided on the piston 21 so as to maintain the fluid-tight state of the hydraulic cylinder 20 without leakage of oil therefrom. At a tip of the piston 21, a third flange 37 formed to extend toward the outer peripheral side and that faces the second flange 29 in the axial direction is provided. The third flange 37 is for pressing the diaphragm spring 13 toward the engine side in the axial direction. Accordingly, the third flange 37 moves back-and-forth in the axial direction of the cylinder integrally with the piston 21, so that the third flange 37 is arranged toward the diaphragm spring 13 side with respect to the tip of the outer body 30. The third flange 37 may be formed integrally with the piston 21, or it may also be formed by connecting a member formed in an annular shape to the piston 21. Further, the third flange 37 corresponds to a plate in the invention.

As described above, the hydraulic cylinder 20 is fixed to the housing 31 of the transmission mechanism by the second bolts 34. On the one hand, the diaphragm spring 13 is retained on the clutch cover 11 so as to rotate integrally with the output shaft 1 of the engine. Therefore, to control power loss incurred by a relative rotation of the diaphragm spring 13 and the third flange 37, a release bearing 23 is provided on a side surface of the third flange 37 on the engine side. The friction clutch 6 is configured such that the diaphragm spring 13 is pressed via the release bearing 23.

On the other hand, to control the release bearing 23 and the diaphragm spring 13 from separating when a hydraulic pressure is not supplied to the hydraulic cylinder 20 or during a transient period that involves reduction of the hydraulic pressure supplied, as shown in FIGS. 1 and 3, the preload springs 22 compressed such that one end thereof contacts the second flange 29 and the other end thereof contacts the third flange 37 are provide on the outer peripheral side of the second cylindrical portion 28. More specifically, the respective preload springs 22 are provided such that a region in the radial direction in which the second bolts 34 are arranged and a region in the radial direction in which the plurality of preload springs 22 are arranged overlap at least in part. In other words, a region formed between a circle contacting the outermost periphery of the preload springs 22 and a circle contacting the innermost periphery of the preload springs 22 and a region formed between a circle contacting the outermost periphery of the second bolts 34 and a circle contacting the innermost periphery of the second bolts 34 overlap in part. A plurality of preload springs 22 are preferably arranged so as to prevent the release bearing 23 from tilting to be in partial contact with the diaphragm spring 13.

In the above-described example, the second bolts 34 that fix the hydraulic cylinder 20 to the housing 31 of the transmission mechanism are arranged such that the region in the radial direction in which the second bolts 34 are arranged and the region in the radial direction in which the preload springs 22 are arranged overlap at least in part. Accordingly, the inner body 27 and the outer body 30 can be clamped on the inner peripheral side. As a result, a diameter of the sealing member 33 can be made small, and therefore, a pressure-receiving area that receives the hydraulic pressure from the oil present between the first flange 26 and the second flange 29 can be reduced. Thus, by reducing the pressure-receiving area that receives the hydraulic pressure from the oil present between the first flange 26 and the second flange 29, a load in the axial direction that acts on the first flange 26 and the second flange 29 can be reduced, and the rigidity required of the first flange 26 and the second flange 29 can be reduced as a result. In other words, because the thickness of the first flange 26 and the second flange 29 can be thin, an axial length of the release mechanism 16 can be made short. Also, by reducing the load in the axial direction based on the hydraulic pressure supplied to the hydraulic cylinder 20, an engagement length required of the second bolt 34 can be reduced. As a result, the thickness of the housing 31 of the transmission mechanism into which the second bolts 34 are screwed, can be reduced, and the axial length of the device as a whole can be reduced thereby.

In the above-described example, the release mechanism 16 is configured such that the inner body 27 and the outer body 30 are clamped by the second bolts 34 that fix the hydraulic cylinder 20 to the housing 31 of the transmission mechanism. The length (screw fitted length) of the second bolts 34 that fix the hydraulic cylinder 20 to the housing 31 of the transmission mechanism as thus is determined from a screw height that is determined in accordance with the load in the axial direction based on the hydraulic pressure received by the first flange 26 and the second flange 29 and from a screw height that is determined so as to control tilting of the hydraulic cylinder 20 resulting from variation in loads in the circumferential direction received from the diaphragm spring 13, vibration of a vehicle, and the like. A fastening force required of the second bolt 34 is much greater in the case of improving withstand load against the load in the axial direction based on a hydraulic pressure received by the first flange 26 and the second flange 29 compared to the fastening force for suppressing the hydraulic cylinder 20 from tilting. Therefore, the length of the second bolt 34 is a length determined in accordance with the hydraulic pressure received by the first flange 26 and the second flange 29 after all.

Accordingly, in the example shown in FIGS. 4 to 7, the first bolts 38 connect the inner body 27 and the outer body 30. The second bolts 34 connect the hydraulic cylinder 20 to the housing 31 of the transmission mechanism. The first bolts 38 and the second bolts 27 are separately provided such that the engagement length of the second bolts 34 that fix the hydraulic cylinder 20 to the housing 31 becomes short. Also, as described above, the outer body 30 receives the hydraulic pressure that exists at the first flange 26 and the second flange 29. Accordingly, the outer body 30 is formed relatively thick in order to control deformation by flexure or the like due to the load based on the hydraulic pressure thereof. Therefore, in the examples shown below, due to the configuration in which the inner body 27 is fixed to the outer body 30, an increase in the thickness required to secure a length for the internal screw portion for fixing the inner body 27 and the outer body 30 can be prevented.

Figure 4:
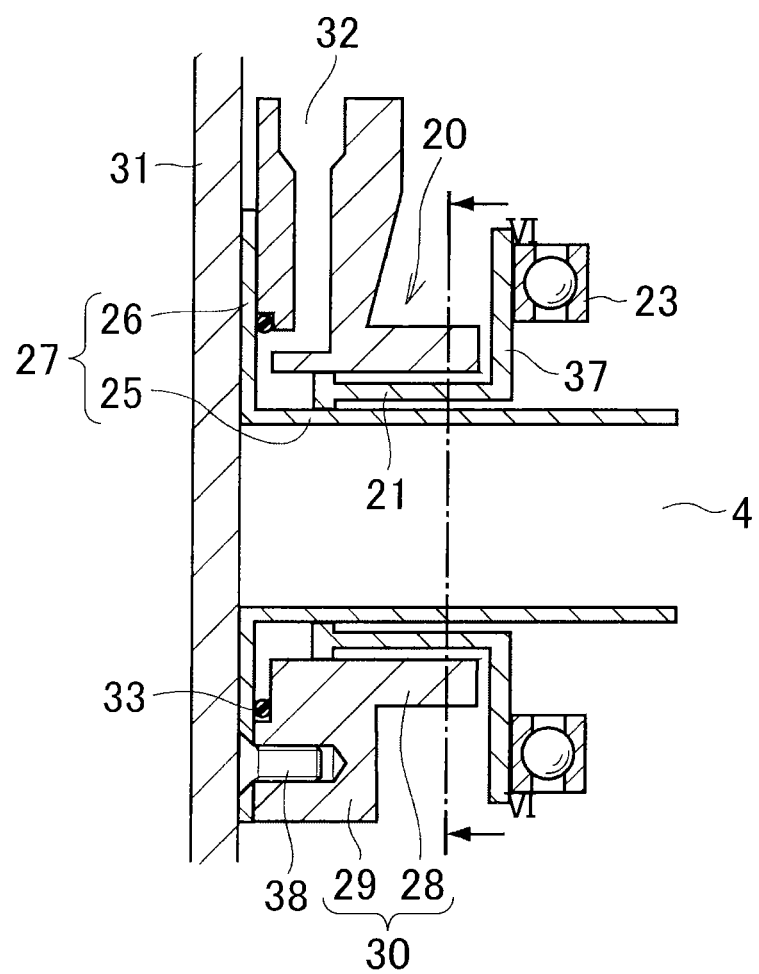
FIG. 4 is a cross-sectional view that illustrates another embodiment, taken along a plane that passes through a bolt that fastens respective flanges.
Figure 5:
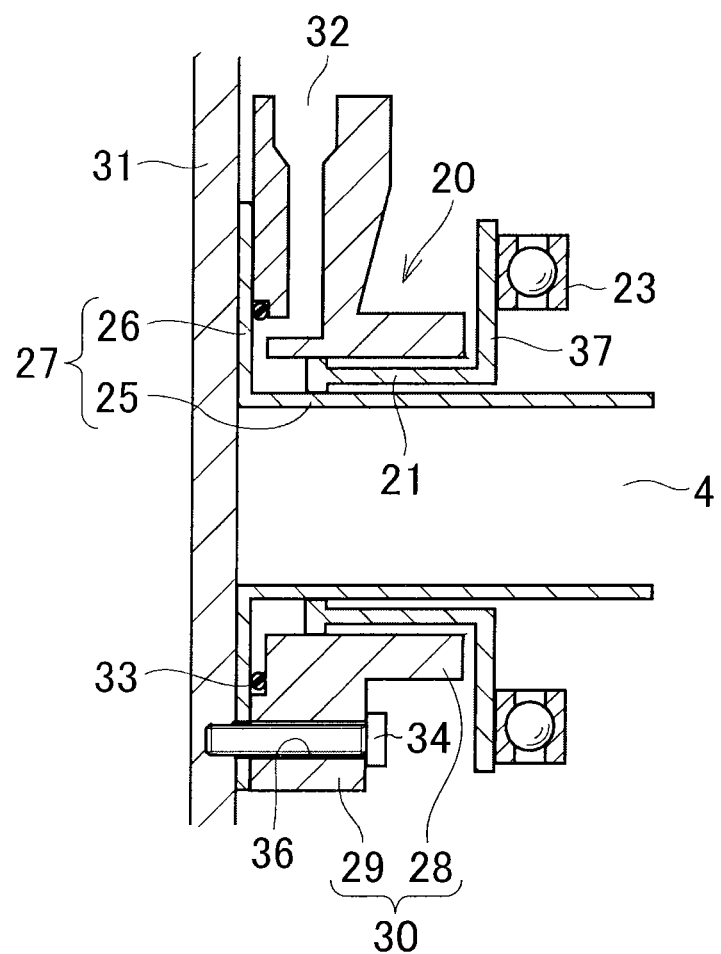
FIG. 5 is a cross-sectional view taken along a plane that passes through a bolt that connects a hydraulic cylinder to a housing.

Specifically, the release mechanism 16 includes the first bolt 38 and the second bolt 34. The first bolt 28, as shown in FIG. 4, is screwed from the side of the first flange 26 to the second flange 29 to connect the first flange 26 and the second flange 29, The second bolt 34, as shown in FIG. 5, is inserted into the through hole 36 formed in the first flange 26 and the second flange 29, and the second bolt 34 is screwed to the housing 31 of the transmission mechanism to connect the hydraulic cylinder 20 to the housing 31 of the transmission mechanism. Note that, as shown in FIG. 5, because the second bolt 34 that connects the hydraulic cylinder 20 to the housing 31 is configured in the same manner as in the example shown in FIGS. 1 to 3, the same reference signs are used.

Figure 8:
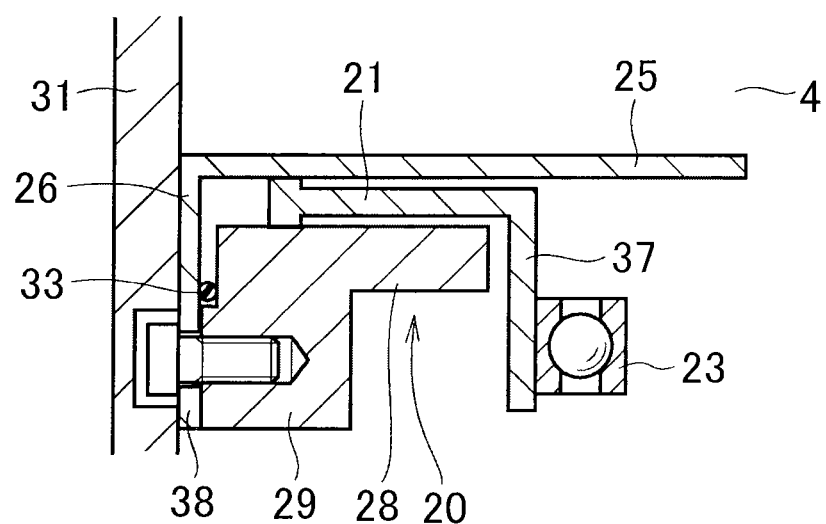
FIG. 8 is a cross-sectional view that illustrates an example in which a head of a bolt that fastens respective flanges is arranged in a recessed portion formed in a housing.

Also, as shown in FIG. 4, because the first bolt 38 is screwed to the outer body 30, the thickness of a portion 39 is formed thick. The internal screw portion is formed at the portion 39. Specifically, the portion is formed at a thickness that is greater than the screw height of the internal screw portion determined based on the hydraulic pressure received by the second flange 29. When the first bolt 38 is screwed to the outer body 30, as shown in FIG. 4, the head of the first bolt 38 is positioned at the inner body 27 side. A countersunk screw is used as the first bolt 38 in the example shown in FIG. 4. However, this configuration is not limited to this. For example, as shown in FIG. 8, a recess may be formed in the housing 31 of the transmission mechanism so that the bolt head does not contact the housing 31. Alternatively, when the housing 31 of the transmission mechanism has ribs formed therein, the configuration may be such that the bolt head is located between the ribs or the like.

Figure 6:
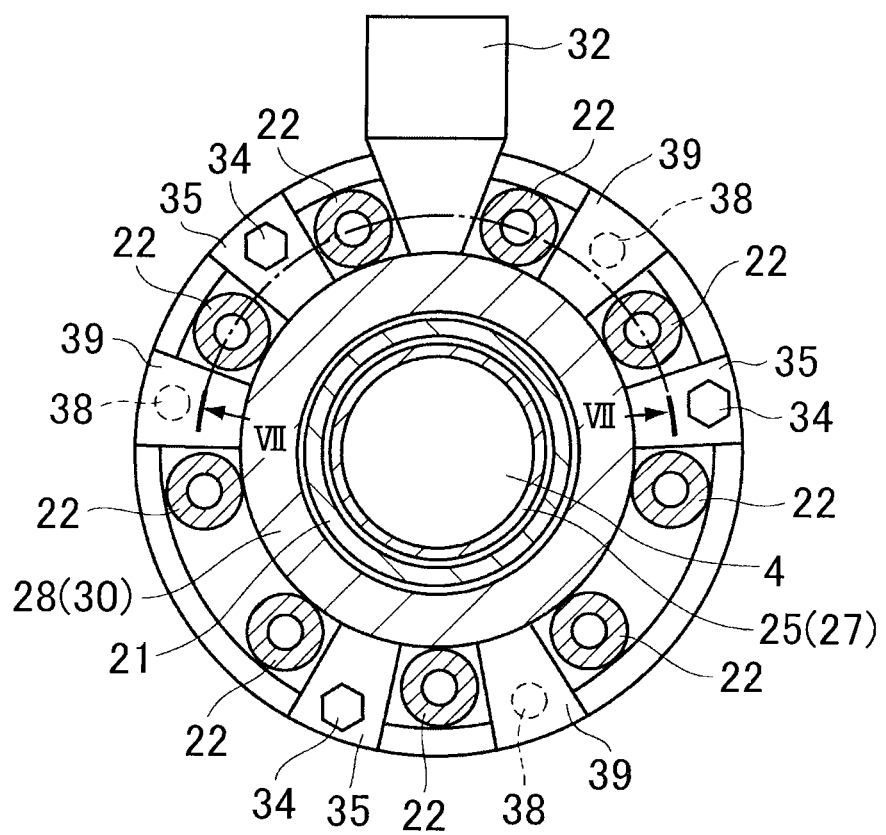
FIG. 6 is a cross-sectional view taken along the line VI-VI shown in FIG. 4.
Figure 7:
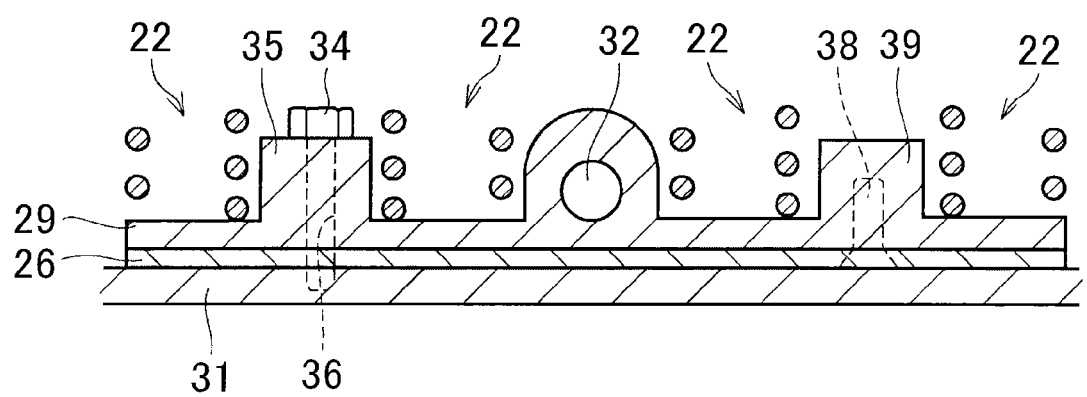
FIG. 7 is a cross-sectional view taken along the line VII-VII shown in FIG. 6.

Further, as shown in FIG. 6 and FIG. 7, the first bolts 38 and the second bolts 34 are provided such that the region in the radial direction in which the first bolts 38 and the second bolts 34 are provided and the region in the radial direction in which the preload springs 22 are arranged overlap at least in part. At the same time, the first bolts 38 and the second bolts 34 are provided alternately in the circumferential direction. In other words, on the second flange 29, the portions 39 that are formed thick for screwing in the first bolts 38 and the base portions 35 that are provided to be in contact with the heads of the second bolts 34 are alternately formed at a predetermined interval, and the preload springs 22 are provided between each of the base portion 35 and the portion 39. In the example shown in FIG. 6, while the first bolts 38 and the second bolts 34 are provided in the circumferential direction in a set of three each and the second bolts 34 and the first bolts 38 are alternately arranged, for example, there may be places where the second bolts 34 are arranged consecutively in the circumferential direction or where the first bolts 38 are arranged consecutively in the circumferential direction.

As described above, by providing the first bolts 38 that connect the inner body 27 and the outer body 30 and the second bolts 34 that connect the hydraulic cylinder to the housing 31 such that tilting of the hydraulic cylinder is suppressed, the screw height required of the second bolts 34 can be made shorter. Accordingly, because the screw height of the internal screw portion in which the above-described second bolt 34 is screwed can be made short, the thickness of the housing 31 of the transmission mechanism can be made thin. As a result, the axial length of the release mechanism 16 can be made short. Alternatively, the axial length of the device as a whole can be prevented from becoming long when the release mechanism 16 is mounted thereto. Also, even when a recess is formed in the housing 31 of the transmission mechanism, as shown in FIG. 8, the thickness of the portion in which the second bolts 34 are screwed can be secured, and therefore an increase in the axial length of the release mechanism 16 can be prevented. Further, by screw fixing the first bolt 38 to the outer body 30, excessive increase in the thickness required to secure the length of the internal screw portion can be prevented. As a result, increase in the axial length of the release mechanism 16 can be prevented. Also, as described above, by connecting the inner body 27 and the outer body 30 via the first bolts 38 into a unit in advance, the release mechanism 16 can be inspected as a unit, for instance. By configuring the release mechanism 16 such that the region in the radial direction in which the first bolts 38 and the second bolts 34 are provided and the region in the radial direction in which the preload springs 22 are arranged overlap at least in part, similar effects as those shown in FIGS. 1 to 3 can be obtained.

Figure 9:
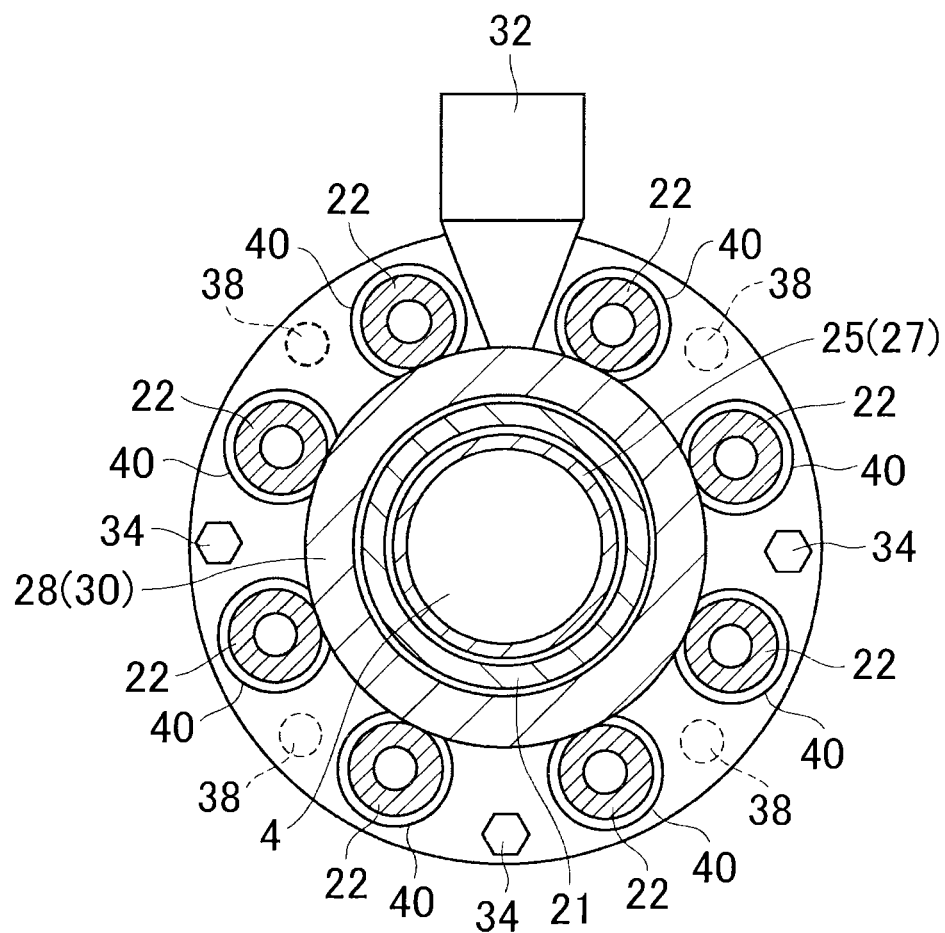
FIG. 9 is a cross-sectional view that illustrates an example of a configuration of a release mechanism configured such that only a part for providing preload springs is recessed.
Figure 10:
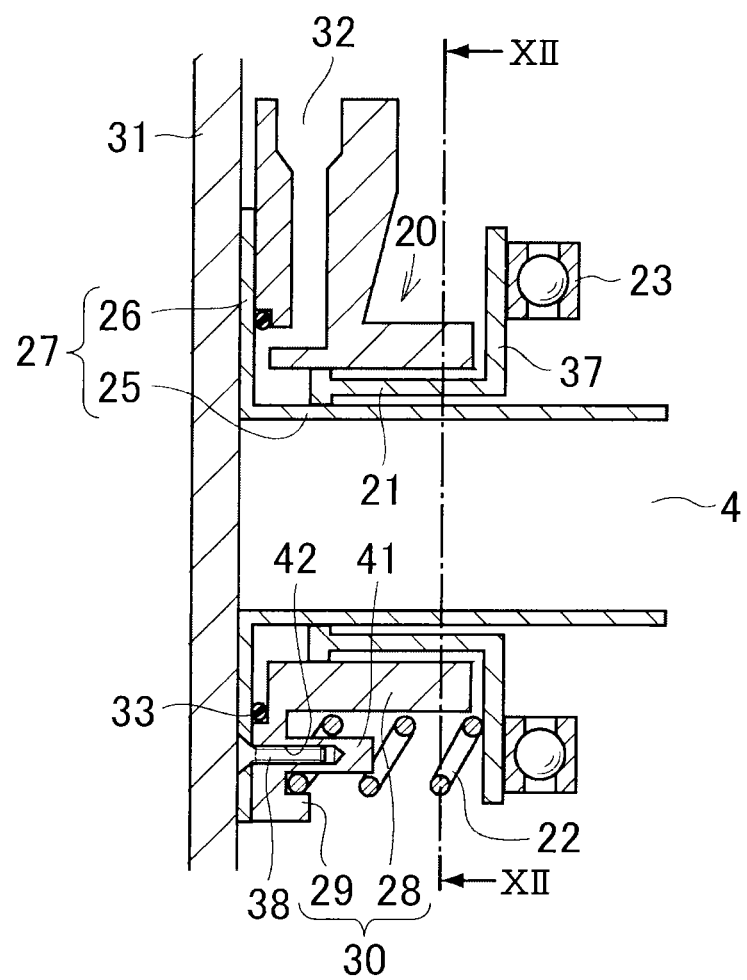
FIG. 10 is a cross-sectional view that illustrates an example of a configuration for screw-fixing a bolt that fastens an inner body and an outer body in an internal screw formed in a cylindrical portion that retains the preload spring.
Figure 11:
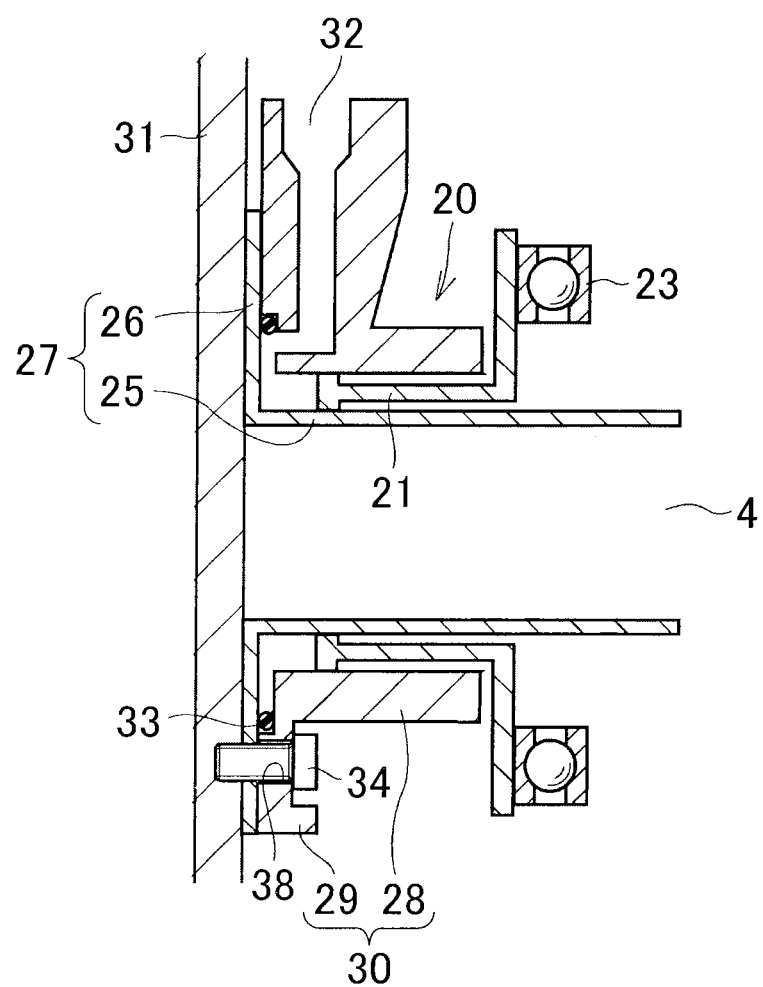
FIG. 11 is a cross-sectional view taken along a plane that passes through a bolt that connects the hydraulic cylinder to the housing.
Figure 12:
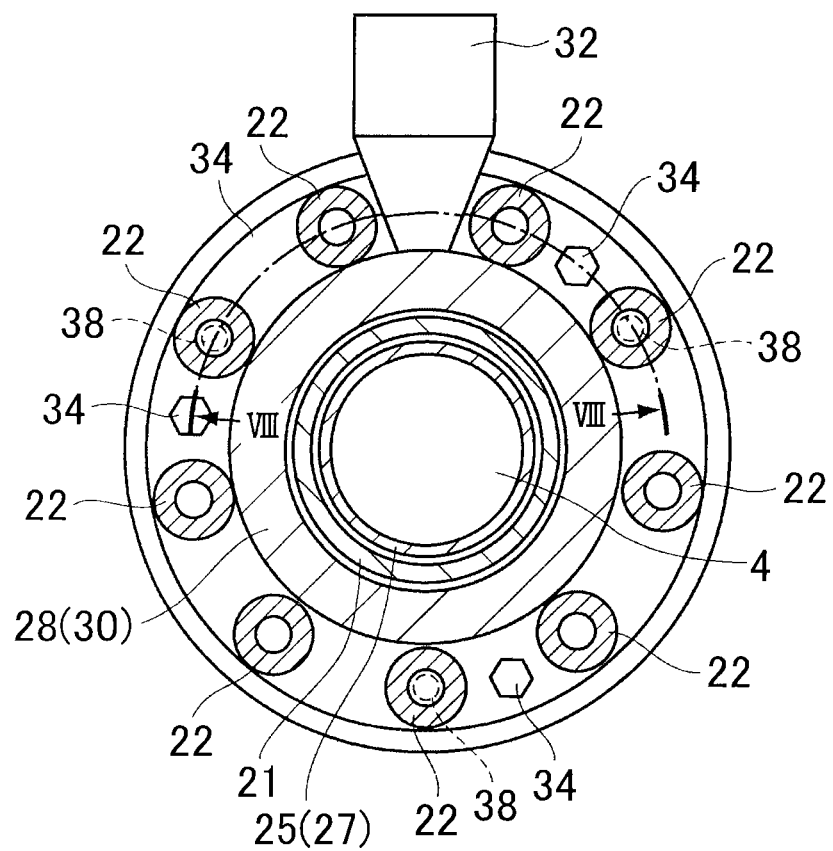
FIG. 12 is a cross-sectional view taken along the line XII-XII in FIG. 10.
Figure 13:
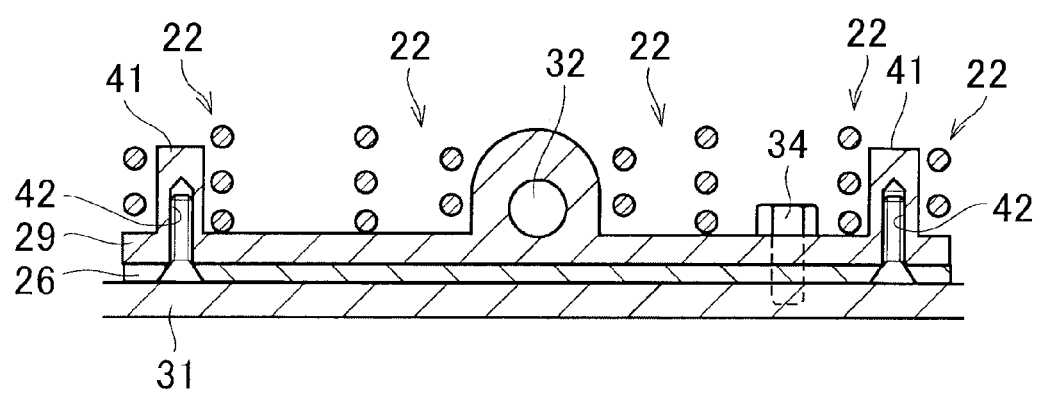
FIG. 13 is a cross-sectional view taken along the line XIII-XIII in FIG. 12.

In FIGS. 4 to 7, while an example of a case in which the portions 39 that are formed thick for screwing in the first bolts 38 and the base portions 35 are alternately formed at a predetermined interval had been described, only parts 40 for providing preload springs 22 may be recessed, as shown in FIG. 9.

In the above-described example, the first bolts 38 and the second bolts are arranged between the preload springs 22, however, as shown in FIGS. 10 to 13, the second bolts 34 may be arranged coaxially with the central axis of any one of the preload springs 22. Specifically, cylindrical portions 41 that protrude on the engine side in the axial direction are integrally formed with the second flange 29. Then, any one of the preload springs 22 are fit on an outer peripheral surface of the cylindrical portion 41, and an internal screw portion 42 is formed on the first flange 26 side of the cylindrical portion 41. Then, the first bolts 38 are screwed into the internal screw portions 42 so as to clamp the first flange 26. In the example shown in FIGS. 10 through 13, the portions at which the second bolts 34 are engaged are on an outer peripheral side with respect to the sealing member 33, and therefore the load that acts based on the hydraulic pressure is relatively low, so the base portions 35 are not provided.

Even in a case configured as shown in FIGS. 10 to 13, the portion at which the inner body 27 and the outer body 30 are connected can be disposed on the inner peripheral side, and thus similar effects as those shown in FIGS. 1 to 3 can be obtained. Also, by providing the first bolts 38 that connect the inner body 27 and the outer body 30 and the second bolts 34 that connect the hydraulic cylinder 20 to the housing 31 of the transmission mechanism, the screw height of the second bolts 34 can be made short, and thus the thickness of the housing 31 of the transmission mechanism can be made thin similarly to the case shown in FIGS. 4 to 7. As a result, the axial length of the release mechanism 16 can be made short. Alternatively, the axial length of the device as a whole can be prevented from becoming long when the release mechanism 16 is mounted thereto.

Figure 14:
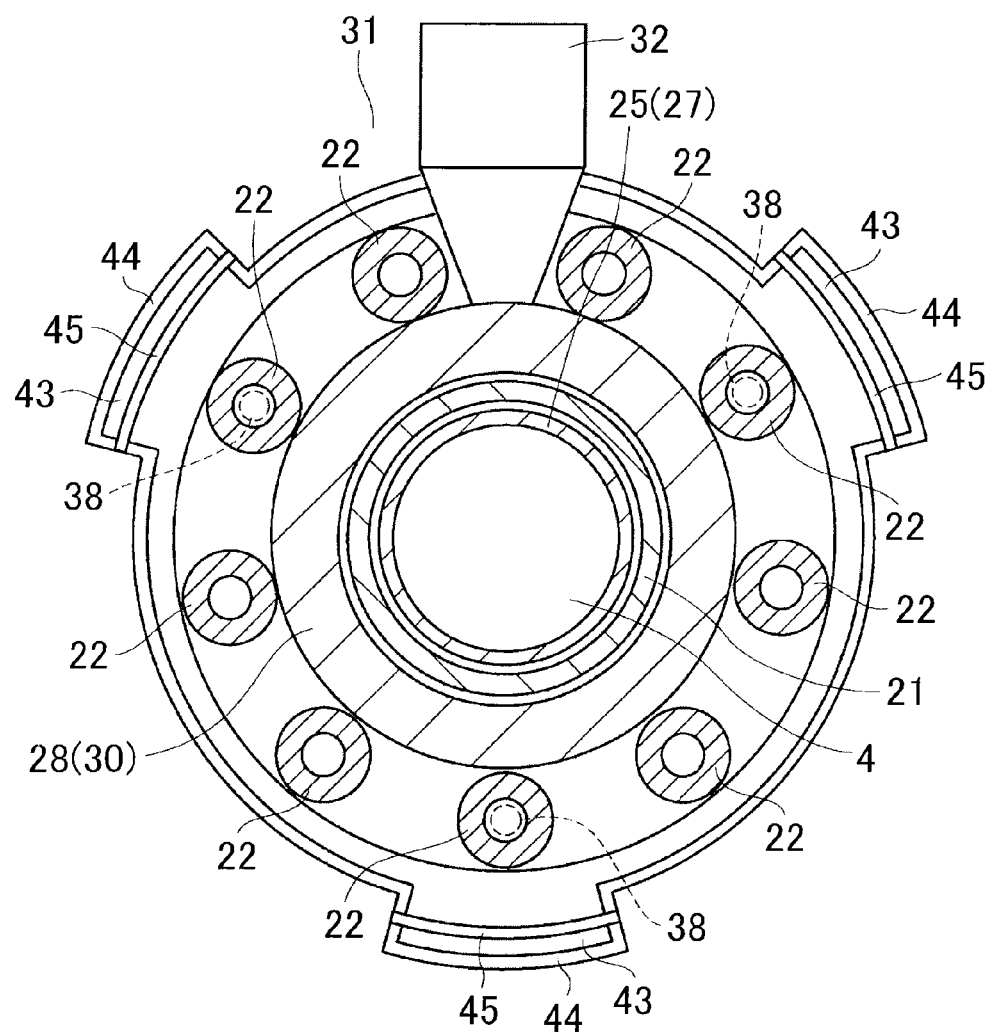
FIG. 14 is a cross-sectional view that illustrates an example of connecting the hydraulic cylinder to the housing without using the bolts.

In each of the examples described above, while a configuration in which the hydraulic cylinder 20 is fixed to the housing 31 of the transmission mechanism by the second bolts 34 has been explained, according to the release mechanism of the invention, it is sufficient if the region in the radial direction in which the member that connects the first flange 26 and the second flange 29 is arranged and the region in the radial direction in which the preload springs 22 are arranged overlap at least in part, and the configuration for connecting the hydraulic cylinder 20 to the housing 31 of the transmission mechanism is not limited. Accordingly, as shown in FIG. 14, a convex portion 43 may be formed on the outer peripheral surface of the second flange 29 and a recessed portion 44 may be formed on the housing 31 of the transmission mechanism that engages with the convex portion 43 in the circumferential direction so that the second flange 29 and the housing 31 of the transmission mechanism are engaged in the circumferential direction, and at the same time, a snap ring 45 or the like may be provided in the transmission mechanism so as to restrict the movement of the convex portion 43 of the second flange 29 that is fit to the transmission mechanism in the axial direction.

By engaging the hydraulic cylinder 20 and the housing 31 of the transmission mechanism without the use of the second bolts 34, the thickness of the housing 31 of the transmission mechanism can be prevented from becoming thick due to formation of an internal screw portion or the like. As a result, the axial length of the release mechanism 16 including the housing 31 of the transmission mechanism can be made short.

In each of the examples described above, a configuration in which the hydraulic cylinder 20 is connected to the housing 31 of the transmission mechanism was described as an example, the point is that the hydraulic cylinder 20 can be fixed, and a member to which the hydraulic cylinder 20 is fixed is not limited to the housing 31 of the transmission mechanism.

What is claimed is:
1. A release mechanism for a friction clutch, the release mechanism comprising:
an inner body;

an outer body fit to an outer peripheral side of the inner body;

a cylinder arranged between an outer peripheral surface of the inner body and an inner peripheral surface of the outer body, the cylinder having an annular cross-section;

a piston accommodated in the cylinder, and the piston being configured to move in an axial direction of the cylinder;

a first flange located at a first end of the inner body in an axial direction of the cylinder, and the first flange extending radially outward of the inner body;

a second flange located at a second end of the outer body in an axial direction of the cylinder, the second flange extending radially outward of the outer body, and the second flange facing the first flange;

a sealing member located between the first flange and the second flange, the first flange and the second flange being connected via the sealing member;

a plate connected to the piston at a third end side of the outer body in the axial direction of the cylinder, the plate facing the first flange and the second flange;

a plurality of elastic members arranged between the plate and the second flange at a predetermined interval in a circumferential direction of the outer body; and a first fastening member configured to fix the first flange and the second flange in the axial direction of the cylinder such that the sealing member is clamped between the first flange and the second flange, wherein a first region of the first flange and the second flange in a radial direction of the first flange and the second flange, and the first fastening member is arranged in the first region, and a second region of the first flange and the second flange in the radial direction of the first flange and the second flange, the elastic members are arranged in the second region, and the first region and the second region overlap each other at least in part.

2. The release mechanism according to claim 1, further comprising:

a second fastening member configured to connect the outer body and the inner body to a fixing portion in the axial direction of the cylinder, wherein the first fastening member is configured to fix the first flange of the inner body and the second flange of the outer body in the axial direction of the cylinder, and the first fastening member is screwed to the second flange.

3. The release mechanism according to claim 2, wherein the second fastening member is screwed to the fixing portion, the second fastening member is configured to connect the inner body and the outer body to the fixing portion, and a third region in the radial direction in which the second fastening member is provided and the second region in the radial direction in which the elastic members are arranged, in the first flange and the second flange, overlap each other at least in part.

4. The release mechanism according to claim 2, wherein the fixing portion has recessed and convex portions that engage with the outer body in the circumferential direction of the outer body, and the second fastening member is connected to the fixing portion and restricts movement of the outer body in the axial direction of the cylinder.

5. The release mechanism according to claim 2, wherein the friction clutch is mounted in a vehicle, the vehicle includes a transmission, and the fixing portion is a housing of the transmission.

* * * * *